United States Patent [19]

Davis, Sr.

[11] 4,224,013
[45] Sep. 23, 1980

[54] AUTOMOBILE VACUUM SYSTEM FOR INFLATING TIRES

[76] Inventor: Arthur Davis, Sr., 3817 Duplessis Park, New Orleans, La. 70122

[21] Appl. No.: 965,929

[22] Filed: Dec. 4, 1978

[51] Int. Cl.³ .................. F04B 35/00; F01L 25/06
[52] U.S. Cl. .................................. 417/404; 91/313
[58] Field of Search .................. 417/404, 403, 393; 91/313

[56] References Cited

U.S. PATENT DOCUMENTS

| 263,338 | 8/1882 | Hudson et al. | 91/313 X |
|---|---|---|---|
| 549,739 | 11/1895 | McGann | 91/313 |
| 627,399 | 6/1899 | Donges | 91/313 |
| 1,199,526 | 9/1916 | Bowser | 91/313 X |
| 2,538,842 | 1/1951 | McFarland | 417/393 X |
| 2,792,785 | 5/1957 | Hayden | 417/393 |
| 2,798,440 | 7/1957 | Hall | 417/393 |

*Primary Examiner*—Leonard E. Smith

*Attorney, Agent, or Firm*—Schmidt, Johnson, Hovey & Williams

[57] ABSTRACT

An air compressor for inflating pneumatic tires of a motor vehicle is particularly adapted to be powered by the negative pressure created at the intake manifold of the vehicle engine. The piston of a reciprocating air pump has a direct mechanical coupling with the plunger of a pneumatic cylinder assembly for driving the air pump. The cylinder assembly in turn is operated by the negative pressure of the intake manifold through a unique valve control system which automatically directs the negative pressure flow in a manner to reciprocate the plunger and hence, drive the air pump piston. In preferred forms, the plunger presents a greater operating area than the air pump piston whereby a pressure multiplying effect is provided to obtain the relatively high inflation pressures required for many pneumatic tires.

3 Claims, 5 Drawing Figures

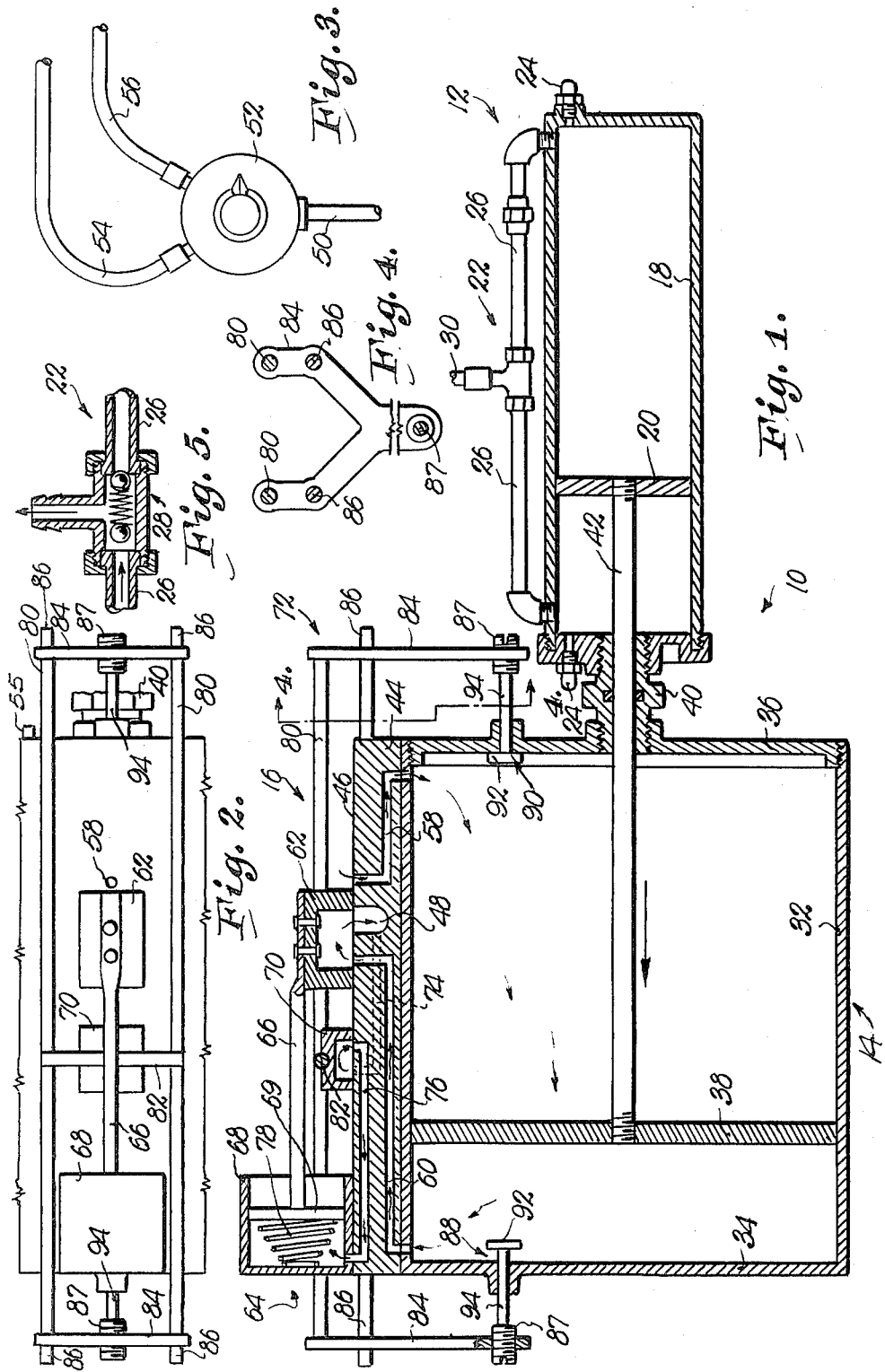

AUTOMOBILE VACUUM SYSTEM FOR INFLATING TIRES

TECHNICAL FIELD

This invention relates generally to pressure apparatus of the type suitable for inflating pneumatic tires, and is particularly concerned with a compact air compressor device for mounting on a motor vehicle and adapted to be operated by the vacuum created at the intake manifold of the vehicle engine.

BACKGROUND ART

It is known to mount an air compressor in a motor vehicle to provide a convenient means for inflating the pneumatic tires on the vehicle. Such compressors are typically mechanically coupled with the motor of the vehicle in order to obtain necessary power to operate the compressor. Such arrangement, of course, reduces the operating efficiency of the vehicle because the compressor normally represents a nonproductive load on the engine.

Improved devices have utilized clutch means or the like for selectively actuating compressors coupled mechanically with the vehicle engine such that the compressor places a load on the engine only during periods of use. While such construction overcomes the detrimental effect of the compressor on the operating efficiency of the vehicle motor, there is presented an additional expense with the provision and maintenance of a suitable clutch means.

DISCLOSURE OF INVENTION

The present invention overcomes the above problems by eliminating the necessity of mechanically coupling the compressor to the engine of the vehicle. Rather, the instant invention contemplates the provision of an air compressor for inflating pneumatic tires on the vehicle, which compressor obtains its operating power solely from the negative pressure created at the intake manifold of the vehicle engine.

A reciprocating-type air pump is driven by a dual-action pneumatic cylinder assembly which in turn may be selectively placed in fluid flow communication with the intake manifold of the vehicle. A unique valving system controls the negative pressure flow created by the intake manifold in a manner to reciprocate the plunger of the cylinder assembly.

The piston in the air pump is coupled for unitary reciprocation with the plunger of the cylinder assembly such that powered reciprocation of the latter under the influence of the negative pressure flow causes simultaneous powered reciprocation of the air pump piston. In preferred forms, the operating area of the plunger is substantially greater than the corresponding operating area of the air pump piston such that there is realized a pressure multiplying effect in the compressor.

Selective operation of the compressor is accomplished by the provision of a flow control valve in the vacuum line between the intake manifold and the pneumatic cylinder assembly. In another form of the invention, the pneumatic cylinder assembly is driven with a vacuum created by a vacuum pump coupled to the vehicle motor.

BRIEF DESCRIPTION OF THE DRAWING

FIG. 1 is a longitudinal cross-sectional view of a compressor constructed in accordance with the principals of the present invention;

FIG. 2 is a fragmentary, plan view thereof;

FIG. 3 is an elevational view of the operating valve for the compressor;

FIG. 4 is an enlarged, fragmentary, cross-sectional view taken along line 4—4 of FIG. 1; and FIG. 5 is an enlarged, cross-sectional view showing the check valve arrangement at the pressure outlet of the air pump in the compressor shown in FIGS. 1 and 2.

BEST MODE FOR CARRYING OUT THE INVENTION

In FIG. 1 there is shown an air compressor 10 comprising a reciprocating-type air pump 12, a dual action pneumatic cylinder assembly 14 operably coupled with the pump 12 for driving the latter, and a valve control system 16 adapted to direct a negative pressure flow in a manner to actuate the cylinder assembly 14 as will be described hereinbelow. It is contemplated that the compressor 10 will be mounted within the engine compartment of a motor vehicle (not shown) and that the system 16 will be coupled in fluid communication with the intake manifold of the vehicle engine by suitable means as described hereinbelow.

The air pump 12 includes a sealed cylindrical barrel 18 and a disc-like piston 20 complementally supported within the barrel 18 for reciprocation along the axis of the latter. The pump 12 exhibits bi-directional compression, having a bifurcated pressure outlet 22 (see FIG. 5) and a pair of spaced one-way check valves 24 respectively in communication with the atmosphere and disposed at opposite ends of the barrel 18. The outlet 22 has a pair of branches 26 respectively communicating with opposite ends of the barrel 18, there being a check valve assembly 28 permitting only air outflow through the branches 26. A flexible conduit 30 is coupled with the outlet 22 to receive the pressure output of the air pump 12; in preferred forms, the conduit 30 is sufficiently long to reach all pneumatic tires on the vehicle, and the distal end of the conduit 30 is provided with an appropriate, conventional air filling valve tool (not shown). It is contemplated that the flexible conduit 30 will be stored within the engine compartment of the vehicle when the compressor 10 is not in use.

The cylinder assembly 14 comprises a relatively large tubular member 32 with opposed sealed ends 34, 36 respectively; and a complemental circular plunger 38 captively received within the member 32 and reciprocable along the longitudinal axis thereof. As shown in FIG. 1, a tubular coupling 40 rigidly and sealingly secures the cylindrical barrel 18 upon the end 36 of member 32 in axial alignment therewith. A connecting rod 42 extends through the tubular coupling 40 and interconnects the piston 20 and the plunger 38 for unitary reciprocable movement.

The valve control assembly includes a valve plate 44 mounted on the member 32 and presenting an uppermost slide surface 46. A vacuum chamber 48 formed in the plate 44 at surface 46 is adapted to be placed in communication with the intake manifold of the motor vehicle. Considering FIG. 3 in this connection, a vacuum line 50 may lead from the intake manifold to an operating valve 52 which serves to establish selective communication between the line 50 and a similar line 54 leading to the chamber 48. The line 54 is coupled by conventional means (such as fitting 55 and a bore (not shown) leading to chamber 48) to plate 44 in a manner to communicate at all times with chamber 48. Other positions of the operating valve may interconnect line 50 with a line 56 for operating other equipment on the vehicle such as windshield wipers.

There is additionally formed in the plate 48 a passage 58 leading from the surface 46 into communication with the interior of the member 32 at end 36, and a passage 60 extending from the surface 46 into communication with the interior of member 32 at end 34.

A slide valve 62 is supported on the surface 46 for sealed reciprocation therealong over the vacuum chamber 48 and passages 58, 60. The valve 62 moves between a first position, shown in FIG. 1, wherein the vacuum chamber 48 is placed in flow communication with the passage 60 while the passage 58 is vented to the atmosphere, and a second position wherein the vacuum chamber 48 communicates with the passage 58 and the passage 60 is vented to the atmosphere. Thus, the valve 62 may be operated in a manner to direct the negative pressure flow created by the intake manifold in a manner to reciprocate the plunger 38 within the member 32. In this regard, note that when the chamber 48 is in communication with the passage 60, negative pressure causes the plunger to move toward end 34 or to the left as shown in FIG. 1. Conversely, when chamber 48 is placed in communication with the passage 58, the plunger 38 will be caused to move toward the end 36.

Control of the slide valve 62 in response to the position of plunger 38 is accomplished by a mechanism 64. Mechanism 64 includes a ram 66 rigidly coupled with the valve 62 for reciprocating the latter between its first and second positions, a cylinder 68 having a piston 69 therein and secured to ram 66, a control valve 70 for operating the ram 66, and a mechanical linkage assembly 72 for shifting the control valve 70 to an appropriate position when the plunger 38 reaches either end of its path of travel.

Considering again FIG. 1, there is shown a passage 74 leading from the vacuum chamber 48 to a remote location on surface 46 adjacent the valve 70. Another passage 76 leads from the surface 46 at the valve 70 to the cylinder 68. The valve 70 is shiftable between a first setting, shown in FIG. 1, wherein the passages 74 is disposed in communication with the passage 76, and a second setting, to the left of the first setting as viewed in FIG. 1, wherein the passage 76 is vented to the atmosphere. When the valve 70 is disposed in its first setting, a vacuum created in the cylinder 68 (through chamber 48 and passages 74, 76) moves the ram 66 to the left as viewed in FIG. 1 and consequently places the slide valve 62 in its first position. On the other hand, when control valve 70 is shifted to its second setting, the cylinder 68 is vented to the atmosphere via passage 76 such that the piston 69 and ram 66 are shifted to the right as viewed in FIG. 1 under the influence of a coil spring 78 disposed within the cylinder 68. Of course, such movement of the ram 66 shifts the valve 62 from the first position to its second position wherein passage 60 is vented to the atmosphere and passages 58 is placed in communication with vacuum chamber 48.

The linkage 72 includes a pair of parallel, laterally offset, longitudinal extending rails 80 supporting a transverse cross beam 82 which supports and carries the control valve 70 as shown for example in FIG. 1. The rails 80 are rigidly attached at opposite ends to a pair of generally U-shaped saddle structures 84 which in turn are each supported for shifting movement relative to the tubular member 32 by a pair of slide pins 86 extending from opposite ends of the plate 44 in a direction substantially parallel to the longitudinal axis of the member 32 and barrel 18. Thus, the structures 84, rails 80, cross beam 82, and control valve 70 are reciprocable as a unit along a path of travel extending parallel to the reciprocable path of the plunger 38 and piston 20. Also, an adjustment screw 87 is provided at the lower end of each saddle structure 84.

A pair of push pins 88, 90 respectively extend through the ends 34, 36 of member 32 for the purpose of sensing that the plunger 38 has reached one end or the other of its reciprocable path of travel. Each of the push pins 88, 90 includes an inner, plunger-engaging disc 92, and an elongated, screw-engaging shaft 94. It will be seen from the drawing that when plunger 38 reaches end 34 of member 32, push pin 88 is shifted to the left as viewed in FIG. 1, to thereby engage the adjacent screw 87 and saddle structure 84; this causes leftward shifting in unison with the saddle structures, rails 80, cross rail 82 and valve 70, until the valve 70 is in its second position described above (with passage 76 vented to the atmosphere). This in turn vents cylinder 88, allowing spring 78 to shift piston 69 and ram 66 to the right as viewed in FIG. 1. This causes rightward shifting of valve 62 to its second position (with passage 60 vented to the atmosphere and passage 58 in communication with chamber 48). In this orientation, plunger 38 is shifted rightwardly as viewed in FIG. 1. Of course, when the plunger 38 reaches end 36 of the member 32, movement of the pin 90 effects shifting of the control valve 70 back to its first setting, with consequent shifting of valve 62 to its first position and leftward shifting, as viewed in FIG. 1, of plunger 38 to start another cycle. Fine adjustment for the movement of valve 70 may be attained by adjusting screws 87 in the bight portions of structures 84.

INDUSTRIAL APPLICABILITY

The intended use of this invention has been fully explained hereinabove. The compressor 10 offers a reliable and convenient source of pressurized air for inflating pneumatic tires of a vehicle without appreciably reducing the operating efficiency of the vehicle engine.

The instant invention clearly offers advantages over devices heretofore available in that none of the known devices are capable of providing sufficient pressure while being operated only by the vacuum created at the intake manifold of the vehicle motor. The unique valve control system 16 accomplishes a degree of reliability heretofore unavailable in devices of this type.

It will be appreciated that this invention offers many benefits to its users in terms of cost saving, safety, and general peace of mind.

Having thus described the invention, what is claimed as new and desired to be secured by Letters Patent is:

1. A vacuum powered air compressor adapted for mounting on a vehicle comprising:
   a reciprocating-type air pump having a barrel and a piston reciprocable therewithin;
   a double acting pneumatic cylinder assembly for driving said pump, said assembly comprising a tubular member sealed at opposite ends and a complemental plunger supported for axial reciprocation within said member, said piston and said plunger being mechanically interconnected for reciprocal movement;

valve means for establishing fluid flow communication between said negative pressure source and said double-acting cylinder in a manner to reciprocate said plunger, said flow control means including a vacuum chamber communicating with said pressure course and a slide valve reciprocable between a first position establishing flow communication between the chamber and one end of said member and a second position establishing flow communication between the chamber and the other end of said member, said control means further including mechanism for shifting said slide valve to said first position when said plunger is at said one end of said member and for shifting the slide valve to said second position when said plunger is at said other end of the member, said mechanism including a cylinder with a single closed end and a ram complementally received within said cylinder for reciprocation therewithin, said ram being operably coupled with said slide valve, there being spring means biasing said ram away from said closed end of the cylinder, said mechanism having a control valve shiftable between a first setting establishing communication between said chamber and said closed end whereby said ram moves in a direction to shift said slide valve to said second position, said mechanism further including a linkage between said pneumatic cylinder assembly and said control valve, said linkage being operable to shift the control valve to said first setting when said plunger reaches said one end of the member and to shift the control valve to said second setting when said plunger reaches said other end of the member, said linkage including a pair of push pins each projecting through opposite ends of said member and each being disposed for shifting movement when contacted by said plunger, the surface area of said plunger normal to its path of reciprocation being greater than the corresponding surface area of said piston, whereby to increase the maximum positive pressure output of the air pump; and means for conveying compressed air from said pressure outlet.

2. The invention of claim 1, said member and said barrel being rigidly intercoupled in axial alignment.

3. A vacuum powered air compressor adapted for mounting on a vehicle having a source of negative pressure comprising:

a reciprocating-type air pump having a barrel, a pressure outlet and a piston reciprocable therewithin;

a double acting pneumatic cylinder assembly for driving said pump, said assembly comprising a tubular member sealed at opposite ends thereof and a complemental plunger supported for axial reciprocation within said member, said piston and said plunger being mechanically interconnected for reciprocal movement;

valve means for establishing fluid flow communication between said negative pressure source and said double-acting cylinder in a manner to reciprocate said plunger;

said flow-establishing valve means including a vacuum chamber communicating with said pressure source, and a slide valve reciprocable between a first position establishing flow communication between the chamber and one end of said member and a second position establishing flow communication between the chamber and the other end of said member, said flow-establishing valve means further including mechanism for shifting said slide valve to said first position when said plunger is at said one end of said member, and for shifting the slide valve to said second position when said plunger is at said other end of the member, said mechanism including a cylinder with a single closed end, a ram complementally received within said cylinder for reciprocation therewithin, said ram being operably coupled with said slide valve, there being spring means biasing said ram away from said closed end of the cylinder, said mechanism having a control valve in operative connection with said control means and shiftable between a first setting establishing communication between said chamber and said closed end whereby said ram moves in a direction to shift said slide valve to said first position, and a second setting venting said closed end to atmosphere whereby said ram moves in a direction to shift said slide valve to said second position; and means operably coupling said plunger and said control valve for shifting of said control valve between said first and second positions thereof in response to shifting of said plunger between said first and second position of the plunger, in order to control movement of said control valve and thereby said slide valve, the surface area of said plunger normal to its path of reciprocation being greater than the corresponding surface area of said piston, whereby to increase the maximum positive pressure output of the air pump; and means for conveying compressed air from said pressure outlet.

* * * * *